United States Patent
Reid et al.

(10) Patent No.: US 7,085,842 B2
(45) Date of Patent: Aug. 1, 2006

(54) LINE NAVIGATION CONFERENCING SYSTEM

(75) Inventors: Clifford A. Reid, Pacifica, CA (US); Murray Low, Santa Cruz, CA (US); Charles R. Anderson, Santa Cruz, CA (US); Neal Rutta, San Jose, CA (US); Kenneth R. Grant, San Carlos, CA (US)

(73) Assignee: Open Text Corporation, Waterloo (CA)

( * ) Notice: Subject to any disclaimer, the term of this patent is extended or adjusted under 35 U.S.C. 154(b) by 719 days.

(21) Appl. No.: 09/782,172

(22) Filed: Feb. 12, 2001

(65) Prior Publication Data

US 2002/0112004 A1 Aug. 15, 2002

(51) Int. Cl.
  *G06F 15/16* (2006.01)
(52) U.S. Cl. .......................... 709/231; 722/87
(58) Field of Classification Search ................ 709/203, 709/217, 223, 231–233; 722/87
  See application file for complete search history.

(56) References Cited

U.S. PATENT DOCUMENTS 5,149,104 A 9/1992 Edelstein (Continued)

FOREIGN PATENT DOCUMENTS

WO WO 97/41504 11/1997

(Continued)

OTHER PUBLICATIONS

R. Yavatkar et al., 1994, "Clique: A Toolkit for Group Communication Using IP Multicast", IEEE, Distributed and Networked Environments, pp. 132-138.

"Streaming Media Technical Analysis", White paper by Appoach, Inc., Nov. 2000, 50 pages.

*Primary Examiner*—John Follansbee
*Assistant Examiner*—M. A. Siddiqi
(74) *Attorney, Agent, or Firm*—Winston & Strawn LLP (57) ABSTRACT

A system for delivery of content over a wide area network, the content being captured by the system over a time period of a live event, the system comprising a first computer connected to a first side of the wide area network, the first computer having a cache for storing at least one data stream and the first computer having access to executable instruction code in an electronically readable medium. The executable instruction code is for at least: (1) identifying a live portion of the at least one data stream containing content captured by the system, the live portion being that portion of the at least one data stream at the first computer containing content captured more recently by the system than the content contained in any other portion of the at least one data stream at the first computer currently available for sending from the first computer to a second computer, the second computer being connected to a second side of the wide area network; (2) identifying a user position portion of the at least one data stream, the user position portion of the at least one data stream being that portion most recently sent from the first computer to the second computer; (3) receiving a first request at the first computer from the second computer; (4) in response to the first request, sending the live portion of the at least one data stream from the first computer to the second computer; (5) receiving a second request at the first computer from the second computer; and (6) in response to the second request, sending a portion of the at least one data stream from the first computer to the second computer containing content captured less recently by the system than content contained in the live portion of the at least one data stream. The first request and the second request may be sent from the second computer to the first computer and responded to by the first computer in alternating fashion during a time period that at least includes the time period of the live event as extended by a latency period of the wide area network.

10 Claims, 7 Drawing Sheets

| MODE | DATA STREAMS | CONTENT DELIVERY SPEED | TIME STAMP OF DATA PLAYED |
|---|---|---|---|
| LIVE | VIDEO, REGULAR AUDIO, SLIDE FLIPS | NORMAL | REAL TIME (TIME OF LATEST DATA CAPTURE + NETWORK LATENCY) |
| REWIND | VIDEO, SLIDE FLIPS (SFn-1) | FAST (REVERSE TIME STAMP ORDER) | DEPENDENT ON USER REQUEST |
| PLAY | VIDEO, REGULAR AUDIO, SLIDE FLIPS | NORMAL | DEPENDENT ON USER REQUEST |
| CATCH-UP | VIDEO, FAST AUDIO, SLIDE FLIPS | FAST | BEGIN: DEPENDENT ON USER REQ. & ut< rt END: WHEN ut = rt |
| PAUSE | | | |

U.S. PATENT DOCUMENTS

| | | | |
|---|---|---|---|
| 5,208,912 A | 5/1993 | Nakayama et al. ......... 395/200 |
| 5,414,455 A | 5/1995 | Hooper et al. |
| 5,442,390 A | 8/1995 | Hooper et al. |
| 5,471,318 A | 11/1995 | Ajuha et al. ................ 358/400 |
| 5,568,181 A | 10/1996 | Greenwood et al. |
| 5,586,264 A | 12/1996 | Belknap et al. |
| 5,603,058 A | 2/1997 | Belknap et al. |
| 5,668,948 A | 9/1997 | Belknap et al. |
| 5,712,976 A | 1/1998 | Falcon, Jr. et al. |
| 5,721,763 A | 2/1998 | Joseph et al. ................ 379/88 |
| H1714 H | 3/1998 | Partridge, III |
| 5,737,028 A | 4/1998 | Bertram et al. |
| 5,761,417 A | 6/1998 | Henley et al. |
| 5,787,472 A | 7/1998 | Dan et al. |
| 5,805,821 A | 9/1998 | Saxena et al. |
| 5,822,525 A | 10/1998 | Tafoya et al. .......... 395/200.34 |
| 5,822,537 A | 10/1998 | Katseff et al. |
| 5,844,979 A | 12/1998 | Raniere et al. |
| 5,867,653 A | 2/1999 | Aras et al. ............. 395/200.34 |
| 5,898,833 A | 4/1999 | Kidder |
| 5,930,493 A | 7/1999 | Ottesen et al. ............. 395/500 |
| 5,931,908 A | 8/1999 | Gerba et al. |
| 5,974,446 A | 10/1999 | Sonnenreich et al. ....... 709/204 |
| 5,999,977 A | 12/1999 | Riddle |
| 6,024,577 A | 2/2000 | Wadahama et al. |
| 6,105,055 A | 8/2000 | Pizano et al. ............... 709/204 |
| 6,108,687 A | 8/2000 | Craig |
| 6,215,526 B1 | 4/2001 | Barton et al. |
| 6,226,422 B1 | 5/2001 | Oliver |
| 6,233,389 B1 | 5/2001 | Barton et al. |
| 6,233,600 B1 | 5/2001 | Salas et al. ................. 709/201 |
| 6,282,404 B1 * | 8/2001 | Linton ........................ 434/350 |
| 6,336,219 B1 * | 1/2002 | Nathan ........................ 725/91 |
| 6,343,313 B1 | 1/2002 | Salesky et al. ............. 709/204 |
| 6,535,909 B1 | 3/2003 | Rust ........................... 709/204 |
| 6,625,656 B1 * | 9/2003 | Goldhor et al. ............. 709/231 |
| 6,728,753 B1 * | 4/2004 | Parasnis et al. ............. 709/203 |
| 6,898,801 B1 * | 5/2005 | Haraoka et al. ............. 725/151 |

FOREIGN PATENT DOCUMENTS

| | | |
|---|---|---|
| WO | WO 99/52279 | 10/1999 |
| WO | WO 00/07368 | 2/2000 |
| WO | WO 00/28736 | 5/2000 |
| WO | WO 00/58833 | 10/2000 |
| WO | WO 00/58834 | 10/2000 |
| WO | WO 00/58967 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |

* cited by examiner

LINE NAVIGATION CONFERENCING SYSTEM

The present invention is directed in general towards the interactive delivery of rich media content over a wide area communication network, and in particular a live navigation web-conferencing system.

BACKGROUND OF THE INVENTION

Web-conferencing generally involves some delivery of rich media content. "Rich media" is a somewhat loosely defined term, but in general it means a combination of more than one of the following forms of content: text, graphics, audio, and video. "Web" may but does not necessarily refer to a specific network or internetwork such as the collection of computers connected to the Internet utilizing World Wide Web applications. Rather, the term "web" as used herein refers to any network or internetwork containing a large number of geographically dispersed nodes.

Although web-conference content might occasionally be viewed well after the conference occurs, the participants in a web-conference generally value experiencing the content at a point in time that has some proximity to the time at which a presenter (or presenters—also referred to herein as a "speaker" or "speakers") is actually giving a presentation. In other words, the concept of "real time," or "live," has relevance to web-conferencing systems.

Web-conferencing usually involves interaction that is somewhat asymmetric in terms of the richness of content shared on the server and client sides of the network. Specifically, the server or servers send rich media content out across the network and clients send non-rich or less-rich media content back to a server for possible transmission to other clients. In a typical web-conferencing system, servers deliver the following over the network: slides with text or with text and graphics, video of the speaker, and audio. Clients interact by sending either text or voice data to a server, typically the content of that data will be questions from conference participants. That text or voice data might be automatically transmitted to all clients, but it might also be transmitted only at the discretion of the conference speaker and/or moderator. In many current systems, voice interaction is handled through a conference call over a traditional telephone network separate from the computer network handling any text, graphics, or video data transmitted during the conference.

Although the typical web-conference does not involve symmetrical interaction in terms of the richness of the media content delivered across a wide area network, for purposes of understanding the present invention, the term "web-conference system" does not preclude systems equipped for handling rich media content delivered from participating client computers. In general, transmission of extensive rich media content from participating client computers will require that a greater amount of specialized executable instruction code in an electronically readable medium resides on or near the participant computer than is required for the primary example of a web-conferencing system described herein. However, such systems do not necessarily exceed the definition of a web-conferencing system simply because they involve rich media transmission from participating client computers.

Web-conferencing involving a primary speaker or speakers and large numbers (dozens, hundreds, or even thousands) of geographically dispersed participants presents several challenges. Some problems stem from inherent technical limitations of existing wide area networks and some stem from the social/logistical issues involved with such events.

A first problem facing current web-conferencing systems is lost data. Web-conferencing events often deliver information that is critical either for the business delivering the information, or for the business recipients. In live web-casts for entertainment purposes, the consequences of limited data loss during transmission are generally relatively minor. However, in the context of web-conferencing, loss of even a small portion of the information presented can have significant consequences. Currently, delivery of rich media content over the Internet is often imperfect. In live streamed media events, some content is often lost during transmission. For this reason, a web-conferencing system is needed that compensates for the inevitable loss of potentially critical data. Although some existing media technologies rely on client side caching to facilitate user review of "live" material (e.g., replay television systems), client side caching does not address the problem of data that is lost during transit through the wide area network.

A second problem facing current web-conferencing systems is inconsistent timing of users joining the conference. Web-conference participants are often unable to be online at the very beginning of a web-conference event. Such participants have a need to view the material that they have missed. However, such participants also have a need to participate in the live web-conference real time (i.e. as close to when content capture initially occurs as possible given a given a lag due to network latencies which could be about 15 or more seconds). Thus, a web-conferencing system is needed that addresses the needs of users to join the conference late (or take breaks during the conference), view missed portions of the conference, but also allows viewers to efficiently catch up to a live view of (and potential interaction with) the conference.

A third problem facing web-conferencing systems is the need to leverage some of the functionality provided by the existing media player programs residing on many client computers. Participants may want to join a web-conference without having to download and install a specialized media player program. Because presently available technologies make it easier to present rich media content by using at least some instruction code that is installed client side, it is desirable to leverage some of the functionality provided by media player programs that are commonly already installed on the computers used by web-conference participants. However, such programs may not readily support all of the modes needed for best delivery of rich media content in the context of a web-conference. Also, it may not be possible for business and legal reasons to modify the instruction code of existing media programs to support all of the modes desirable for live navigation web-conferencing. Finally, even if such pre-existing programs do in theory support many of the modes needed for live navigation web-conferencing (e.g., reverse, play, fast forward), it may not be practically feasible for a server side machine to communicate adequately with the pre-existing client media player program to invoke the full cooperation of that program in the joint implementation of the desired modes. Therefore, there is a need for a web-conferencing system that leverages some of the functionality of pre-existing media player programs installed on client computers while at the same time overcomes the limitations of those programs and overcomes the problems of communicating with those programs.

A fourth problem facing web-conferencing systems is the handling of audience questions/comments. Handling questions/comments from participants becomes unwieldy in a traditional conference call format once more than a few people are on the call. However, there is still a need to relate important questions/comments to the primary speaker or speakers. Existing systems that do not rely on a traditional conference call approach to participant questions typically rely on email or other text transmission methods to deliver participant questions. However, such approaches can have drawbacks. In some instances, it may be preferred to have the question delivered in the participant's own voice to more readily communicate points of emphasis, or simply because it may be easier for some participants to ask questions through voice communication rather than through written text. In other instances, however, written text questions are preferred. However, whether text or voice data is used to communicate questions, another problem web-conferencing systems must address is how questions are to be shared with the audience. If the questions are shared automatically as they are asked, then the speaker may be pressured to address too many questions at once, thereby interrupting the flow of the presentation. On the other hand, even if questions are not immediately shared with the audience, there is a need for the speaker and/or a moderator to efficiently manage incoming questions. Thus a web-conferencing system is needed that addresses various issues related to the handling of questions/comments from participants.

SUMMARY OF THE INVENTION

The present invention addresses the first two category of problems discussed above through aspects of a system that employs a server side cache and also addresses these problems through other aspects of a system that employs both live and non-live streaming modes. The third category of problems discussed above is addressed through different aspects of a system that use modification of time stamps when necessary to create the experience of multiple modes even through a client side media player remains fixed in a single mode. The third category of problems discussed above is addressed through different aspects of a system including uniquely generated slides used alternatively or in combination with the creation of audio files for easy handling by a moderator and/or a speaker.

These and other aspects of the invention will become apparent to one of ordinary skill in the art upon consideration of the following Detailed Description and the Drawings.

BRIEF DESCRIPTION OF THE DRAWINGS

The novel features of the invention are set forth in the appended claims. However, for purpose of explanation, several aspects of an embodiment of the invention are described by reference to the following figures.

FIGS. 3b–3e illustrate data streams used by various modes set forth in FIG. 3a.

DETAILED DESCRIPTION OF THE DRAWINGS

In the following description, numerous details are set forth for purpose of explanation. However, one of ordinary skill in the art would realize that the invention may be practiced without the use of these specific details. In other instances, structures, devices, and methods are shown in block diagram or table form in order not to obscure the description of the invention with unnecessary detail.

Figure 1:
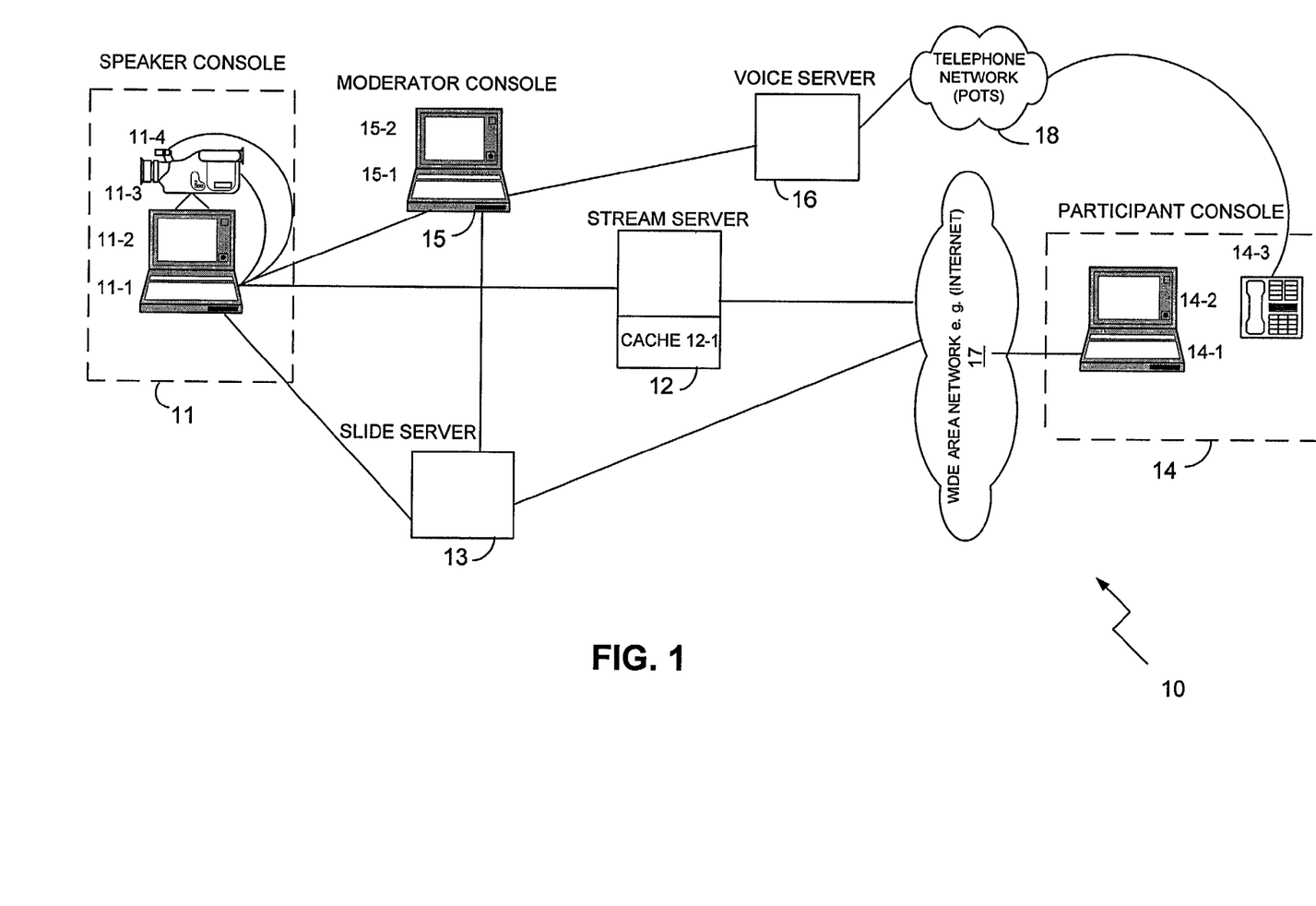
FIG. 1 illustrates a system level view of a presently preferred embodiment of the invention.

FIG. 1 illustrates an exemplary live navigation web-conferencing system 10 comprising speaker console 11, stream server 12, slide server 13, participant console 14, moderator console 15, and voice server 16. Speaker console 11 includes computer 11-1 connected to display monitor 11-2, video camera 11-3, and microphone 11-4. Participant console 14 includes computer 14-1, display monitor 14-2 connected to computer 14-1, and telephone 14-3. Although participant console 14 as illustrated does not include a video camera or a microphone connected to computer 14-1, alternative embodiments might include such devices. Moderator console 15 includes computer 15-1 and connected monitor 15-2. Although moderator console 15 does not include a video camera or a microphone connected to computer 15-1, alternative embodiments might include such devices. Stream server 12 includes cache 12-1 which preferably may be connected internally to stream server 12 as illustrated or may alternatively be connected external to stream server 12.

Speaker computer 11-1, moderator computer 15-1, and participant computer 14-1 are all typical personal computers including various interfaces for user input (e.g. keyboard, mouse) not separately shown. Computers 11-1, 14-1, and 15-1 all have connected sound systems—not separately shown—for allowing users to hear audio content played on the respective computers. These computers, along with voice server 16, slide server 13, and stream server 12 all have access to executable instruction code in an electronically readable medium (code and medium not separately shown). The executable instruction code in an electronically readable medium directs the illustrated computers to carry out the various tasks described herein. In the present embodiment, the code for carrying out the tasks described relevant to this system is primarily realized in software. However, it will be appreciated by those skilled in the art, that other embodiments might utilize code realized in hardware to perform some or all of the identified tasks. Furthermore, while the following description locates particular tasks on particular machines in the system, it will be appreciated by those skilled in the art that many of the identified tasks might be performed on other system machines without departing from the spirit of the invention; also, alternative embodiments might utilize a lesser or greater number of machines.

Computer 14-1 may be thought of as a "client" device. All that means in this context is that computer 14-1 may request and receive services from stream server 12 or slide server 13. Stream server 12 and client computer 14-1 are connected through wide area network 17; thus stream server 12 may be thought of as connected to a first side of wide area network 17 and client computer 14-1 may be thought of as connected to a second side of wide area network 17. In the illustrated presently preferred embodiment, stream server 12, voice server 16, moderator computer 15-1, slide server 13, and speaker computer 11-1 are all shown as being on the same side of wide area network 17. In other words, some connection paths run between these various devices unmediated by a wide area network (of course these connection paths are typically mediated by a local area network—not separately illustrated). It will be appreciated by those skilled in the art that this need not necessarily be the case. For example, moderator console computer 15-1 might connected to speaker console computer 11-1 and/or to slide server 13 via a wide area network connection.

In the context of rich media streaming over a wide area network, client devices will typically have loaded into memory some form of "desktop player" program (also referred to herein as a "media player" program) for playing the rich media content that is streamed to the client device. These devices typically receive data streams and may cache those data streams on the client device. Client-side caching may serve multiple purposes. It may allow buffering so that the media player program can wait to begin playing content until an adequate amount of the requested synchronized data streams has built up in client-side cache so that smooth presentation of the content may begin before all of the data stream has arrived. It may also allow some client side implementation of multiple modes, for example, a user may rewind to previously viewed portions of the data stream and play those portions again without having to re-request the data stream from a remote server.

In the present embodiment, participant computer 14-1 has a media player program. (It will be appreciated by those skilled in the art that such an application need not necessarily be pre-loaded on participant computer 14-1, but rather may alternatively be streamed on request to the client computer, or may, in some other contexts, be executed primarily on a remote server and viewed through more limited mechanisms resident on the client device). In a preferred setting, the desktop player receives the streamed data, reads the time stamp, and presents the content of the data to the user based on the data's time stamp, the time stamp of data most recently played for the user, and the mode in which the viewer has currently requested to view data. In the presently preferred embodiment, stream server 12 receives mode requests from participant computer 14-1 and sends selected data streams data to computer 14-1. The content, order, and time stamp of the data streamed to the desktop player by stream server 12 depends upon the requested mode (see FIG. 3 and accompanying text for discussion of modes, e.g. LIVE, PLAY, REWIND, CATCH-UP, PAUSE) and upon the time stamp of data most recently sent to computer 14-1, which stream server 12 tracks for each client computer such as participant computer 14-1 (see FIG. 4 and accompanying text for discussion of user objects).

A live navigation web-conferencing system, such as system 10, is easier to build and implement when the media player program residing on participant computer 14-1 is constructed so as to be capable of readily cooperating with server 12 in the implementation of various modes in response to the live navigation requests of a participant at participant computer 14-1. For example, if a user requests to view content in a reverse mode, the stream server might send data units to the participant computer in reverse time stamp order without adjusting the original time stamps applied to the respective data units. The client media player would recognize that the user had requested reverse mode, and would expect to receive and play the data units in reverse time stamp order. However, particular media player programs may exist in wide distribution residing on client computers that have executable code that is difficult to modify, or modification would be inappropriate and/or impractical. A live navigation conferencing system such as system 10 may need to adapt to the existence of such programs. See FIG. 6 and accompanying text for an example of such adaptations.

Figure 2:
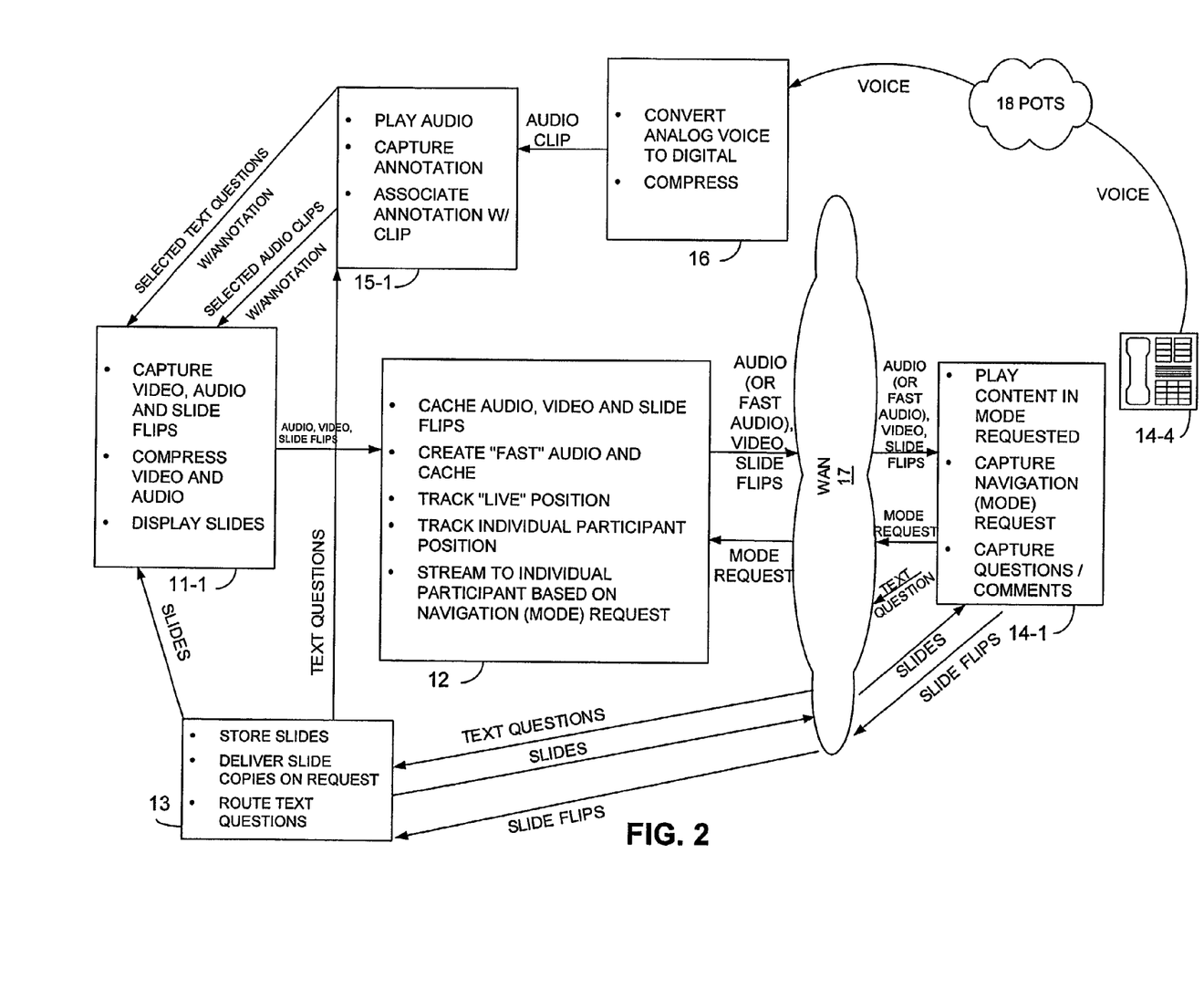
FIG. 2 identifies some of the tasks performed by the various components of the embodiment shown in FIG. 1 and diagrams some of the data flows therein.

FIG. 2 illustrates the data flows and enumerates tasks that may be performed by the various components of system 10. A web-conference presentation will ordinarily involve a primary speaker or speakers who interact with a speaker console such as speaker console 11. Such a presentation may also involve a moderator or moderators who interact with a moderator console such as moderator console 15. Web-conference participants may interact through a participant console such as participant console 14. A typical web conference will involve a relatively small number of speakers (as few as 1) and a relatively large number of participants (a dozen, several dozen, hundreds, or even thousands.). Thus, in a typical web conference system, many participant consoles such as participant console 14 will be connected to wide area network 17 as well as possibly having phones such as phone 14-3 connected to POTS ("Plain Old Telephone Service") network 18.

The web-conference presentation will ordinarily include "slides" which here simply means sets of text and/or graphic content that are formatted by a program to appear in a series of single screen views. One "slide" will typically be displayed on a screen at a time. However, in some presentations, or in some views provided by the presentation program, either multiple slides might be presented on a screen at a time, or a slide might be presented that is larger than a user's screen and requires scrolling to view all the information on the slide. In its broadest aspect, a slide is simply a collection of content (which may include any or all of the following: text, graphics, video, audio) that is somehow graphically framed when presented on the screen to indicate its separation from other collections of content (i.e. from other slides). A presentation may include one or more slides.

Prior to or during a presentation, a set of slides may be loaded onto slide server 13. Prior to a presentation, speaker computer 11-1 and/or participant computer 14-1 may request that slide server 13 send a copy of all of the presentation slides to speaker computer 11-1 and/or participant computer 14-1 respectively. Pre-requests for such slide sets may allow a participant to preview the presentation slides in order to be more prepared for the presentation. However, it is not necessary for slide to be pre-requested in such a manner. Alternatively, the participant computer may only request individual slides from slide server 13 during viewing of the complete presentation. Similarly, speaker computer 11-1 may pre-load slides or may request individual slides from slide server 13 during the actual presentation.

When the speaker is presenting, the speaker potentially generates visual, audio, and textual content, any or all of which may be captured by system 10. Camera 11-3 captures video of the speaker and microphone 11-4 captures audio of the speaker's voice. A keyboard and/or mouse or other user input device (not separately shown) connected to computer 11-1 captures slide flip commands ("slide flips" for short) from the speaker. Slide flip commands are simply requests to go to a different slide than the one currently being displayed.

Speaker computer 11-1 executes an encoder program (not separately shown) that processes and synchronizes the data streams associated with the capture of content by the various sources of input. The term "encoder program" here is simply an identifying label used to refer to the executable instruction code in an electronically readable medium responsible for directing computer 11-1 in the tasks of processing and synchronizing the various streams of data containing captured content. The encoder program uses a clock (i.e. a device capable of communicating units of time—clock not shown) to properly sequence the units of data captured by each input source and to synchronize each separate stream of data.

In understanding various aspects of the present invention, it is useful to define and distinguish two separate concepts: "data," and "content." "Data" as used herein, will refer to sets of electronically readable signals (typically in digital format) that represent, or "contain," content. "Content" as used herein will refer to humanly perceivable information. E.g., the visual impressions created over time when a segment of video is played is a content stream; a sequence of data units known as video frames is a data stream that may be said to "contain" a content stream, i.e., when the video frames are played, the video content stream (visual impressions over time) may be communicated to a viewer. Often there will be a one-to-one correspondence between content streams and data streams. However, as will be described further, two or more data streams having different characteristics may contain the same content stream.

A clock is used to mark particular units of data with an initial time stamp corresponding to the time at which the content represented by the particular data unit was generated for capture by the system. In this manner, multiple streams of data may be "synchronized" which simply means that the time stamps on each stream identify the appropriate time position of the data in one stream relative to the data in other streams using as a reference point the time at which content corresponding to the data in the respective streams was generated.

For example, if a person says "I ran to work today" while speaking into a microphone and being video taped, at least two data stream may potentially be created containing two different content streams. A first content stream, the audio of the person's voice, may be captured by a system and used to create a sequence of audio data units known as audio samples. A second content stream, the person's appearance over time, may be captured by a system and used to create a set of video frames. A clock maybe used to stamp the audio samples with time codes corresponding to the times at which the particular parts of the sentence contained in the samples were spoken (e.g., person said "ran" between tx and ty; samples containing the audio of the person saying the word "ran" are stamped with values between tx and ty). Likewise, the clock may also be used to stamp the video frames with time codes corresponding to the times at which the person's visual image as contained in the stamped frames appeared to the camera (e.g., person made a particular facial expression while saying the word "ran" between tx and ty; video frames containing that facial expression are stamped between tx and ty). The video and audio are now synchronized because the time codes may be used to determine which audio samples should be presented with which video frames (e.g., audio samples between tx and ty containing the person's voice saying the word "ran" are played at the same time as video frames between tx and ty depicting the facial expression made by the person while saying the word "ran").

The encoder program allows computer 11-1 to organize the captured content streams into separate data streams ("tracks"), each data stream derived from the content delivered through one or more sources. For example, camera 11-3 captures video content corresponding to a stream of video frames, microphone 11-4 captures voice content that is sampled for conversion to digital format and corresponds to a stream of audio samples, and a keyboard and/or mouse (not shown) delivers slide flip commands corresponding to a text stream of slide flips. The encoder program may add an additional source for the audio track, as discussed further below in connection with handling phoned-in participant questions. It is also possible in alternative embodiments that a single stream of content captured by an audio source, e.g. microphone 11-4, might be used to create two tracks of audio data, for example, in order to deliver stereo audio. For presentations that only involve voice data, mono-audio is adequate, although multiple tracks of mono-audio might be created corresponding to varying degrees of quality (see below discussion of creating tracks for varied quality levels just prior to the description of FIG. 4). Computer 11-1 may also handle synchronizing the data streams already mentioned with a text stream. In the presently preferred embodiment, a single text track handles both delivery of slide flip commands and delivery of question text as described further in connection with FIG. 7. The encoder program also compresses the video and audio data streams for more efficient transmission of the data throughout system 10.

Speaker computer 11-1 transmits the video, regular audio, and slide flips to stream server 12. The audio transmitted to stream server 12 from computer 11-1 is referred to here as "regular" audio only for the purpose of distinguishing it from the "fast" audio track that is created on stream server 12 and described in further detail below.

Stream server 12 uses the regular audio data to create "fast audio" data. The fast audio track is a different data stream than the regular audio track. Fast audio herein means simply that the "content rate" of the fast audio is greater than the content rate of the regular audio. The term "content rate" is used to highlight the fact that, although more content may be delivered per unit time using fast audio, it is not necessarily the case that more data units (audio samples) are delivered per unit time. Specifically, in the presently preferred embodiment, one second of the regular audio track contains 11,025 samples. One second of the fast audio track also has 11,025 samples. However, the one second of fast audio is created using the content contained in 1.33 seconds of regular audio (i.e. 14,700 samples of regular audio is used to create 11,025 samples of fast audio). Thus, in the case of the fast audio track relative to the regular audio track, the amount of content delivered per second is greater even though the data rate, i.e. samples delivered per second, is the same.

The fast audio is capable of presenting, or "playing," more content per unit time while still sounding substantially similar to regular audio. For example, if a portion of the regular audio data contains content of the speaker's voice saying "Today's presentation is about turtles," stream server 12 creates a corresponding portion of fast audio data containing the speaker's voice saying the same words: "Today's presentation is about turtles." Because the content rate of the fast audio data is greater than the content rate of the regular audio data, it takes less time to play the fast audio data containing the content "Today's presentation is about turtles" than it would to play corresponding portion of regular audio data containing the speaker's voice saying the same words. In the present case, the fast audio data containing the speaker's voice saying "Today's presentation is about turtles" has fewer samples than the corresponding portion of regular audio. Thus, although it takes less time to play the content using fast audio, the number of samples played per second is the same whether playing the fast audio or the regular audio.

The creation of the fast audio data track may be accomplished through various methods known in the art. Preferably, pitch compensation techniques are used to create the fast audio track. A stream of audio samples normally contains both amplitude information and frequency information. Frequency information corresponds to the pitch of the sound. If a set of audio samples based on a real time recording are simply played at a faster rate in order to try and achieve a higher content rate, the amplitude information is unchanged but the frequency information is distorted resulting in higher than normal pitch. Pitch compensation techniques typically involve retrieving the frequency/pitch information from a stream of audio samples and then using that information to create a new set of samples designed specifically for delivering more content per unit time. Instead of simply delivering the regular audio samples at a faster than real time data rate, a new set of samples is created that can communicate more content per unit time while still being played at the same samples/second rate as the regular audio samples would ordinarily be played, thereby preserving the frequency (and therefore pitch) information contained in the regular audio samples.

For further information on creating pitch compensated audio for faster (or slower) delivery of content, see the following: (1) G. Fairbanks, W. L. Everitt, and R. P. Jaeger "Method for time or frequency compression-expansion of speech," Transaction of the Institute of Radio Engineers, Professional Group on Audio, AU-2:7-12, 1954, Reprinted in G. Fairbanks, Experimental Phonetics: Selected Articles, University of Illinois Press, 1966; (2) B. Gold and L. Rabiner, "Parallel processing techniques for estimating pitch periods of speech in the time domain." Journal of the Acoustical Society of America, 46, pp. 441–448, 1969; and (3) B. Arons. "Techniques, Perception, and Applications of Time-Compressed Speech," Proceedings of 1992 Conference, American Voice I/O Society, Sep. 1992, pp. 169–177; all of which are incorporated herein by reference.

Stream server 12 stores the regular audio, the fast audio, the video, and the slide flips on cache 12-1. Cache 12-1 is any computer readable medium capable of storing data for later delivery. The data may be cached in random access memory for maximum speed of access, or it may be cached in hard disk or other permanent memory for security against a power failure or other problem that could cause loss of data stored in memory. In other words, portions of stream server 12's random access memory, or hard disk, or both may serve as cache 12-1. The server side caching carried out by system 10 is in addition to rather than exclusive of any client side caching that may be carried out by media player programs resident on client devices as described above.

Herein, data streams received at and delivered from stream server 12 (or other computers in system 10) are not referred to as "copies" even though the data streams are also retained in cache 12-1 and even though the same data stream may sent to multiple locations.

Stream server 12 is responsible for streaming the following data to one or more participant computers: audio (or, alternatively, fast audio), video, and slide flips (and in some instances text as discussed below in connection with FIG. 5). Whether and when each particular data type is streamed to the participant computer depends at least in part on what "mode" the participant computer has requested. (See FIGS. 3a–f and accompanying text for a further discussion of modes). Stream server 12 is capable of tracking the data stream position of one or more participant computers individually. In other words, two different participant computers similar to participant computer 14-1 might be requesting different portions of the relevant data streams corresponding to different portions of the web-conference presentation (see FIG. 5 and accompanying text).

Participant computer 14-1 receives and plays data streams from stream server 12 based on the mode that a participant at computer 14-1 has requested. In the preferred embodiment, audio (or alternatively fast audio), video, and slide flips are transmitted to participant computer 14-1 from stream server 12. Once audio (or alternatively fast audio), and/or video data is received by the desktop player program on participant computer 14-1, it is available for display via a sound system (not shown) connected to participant computer 14-1 and/or via display monitor 14-2 respectively. A slide flip from stream server 12 prompts participant computer 14-1 to request a particular slide from slide server 13. For example, a slide flip "get slide 4" prompts the participant computer 14-1 to request slide 4 from slide server 13. In response to this request, slide server 13 sends the particular slide to participant computer 14-1. Once the participant computer 14-1 receives the particular slide, participant computer 14-1 may display the slide for the participant via connected monitor 14-2. Alternatively, if a participant computer has pre-loaded all the slides, a slide flip could prompt a participant computer to retrieve a particular slide from storage in memory resident on/connected to the participant computer itself.

A participant at participant console 14 may introduce data containing comments/questions into system 10 in two different ways. First, a participant might use telephone 14-3 to place a call via POTS ("plain old telephone service") telephone network 18 which is delivered to a voice mail system (not shown) which may or may not be resident on voice server 16. Voice server 16 converts analog data to digital format (unless the data received is already in digital format) and also performs any data compression necessary for efficient further transmission. Voice server 16 then sends the data to moderator computer 15-1. A moderator at moderator console 15 may listen to the audio data containing the question/comment from a participant (for short referred to as the "audio clip"), may optionally enter annotations to be associated with the audio clip, and may request that the clip be transmitted (or selectively not request further transmission of the data) to the speaker computer 11-1. Moderator computer 15-1 associates any annotations entered by the moderator with the particular audio clip, and then, in response to input from the moderator, selectively sends the audio clip together with any associated annotations to speaker computer 11-1. Speaker computer 11-1 displays annotations for viewing by the speaker via display 14-2. Computer 11-1 also presents a user interface allowing a speaker to selectively share the audio data containing the participant's comment/question with all of the web-conference participants. When the speaker enters a command to play the audio clip and share it with the audience, that clip becomes a second audio source (in addition to microphone 11-4) which computer 11-1 uses for creating the regular audio stream. Preferably, when such audio clips containing user questions are played, computer 11-1 turns down the volume corresponding to microphone 11-3 so that inadvertent noise does not disrupt clear presentation of the audio clip.

As a second alternative, instead of using telephone 14-3 to submit participant questions into system 10, a participant might submit questions in text format. Text questions may be transmitted using email protocols, or other text transfer protocols. A text question transmitted from a participant computer such as computer 14-1 is transmitted via WAN 17 to slide server 13 and then to moderator computer 15-1. Interaction between slide server 13, moderator computer 15-1 and speaker console computer 11-1 may create a special Q/A slide for selectively (or non-selectively) communicating the question to the speaker and for selectively sharing the question with connected participant computers. The way in which this is accomplished is described in further detail below—see FIG. 7 and accompanying text.

In alternative embodiments, a participant might deliver a question using voice data by speaking into a microphone connected to participant computer 14-1, thus allowing voice delivery of questions to moderator computer 15-1 without relying on telephone 14-3 and telephone network 18. However, this would require each participant computer to have the capability of properly converting the voice data to digital format and properly compressing the voice data for efficient transmission across a wide area network.

Figure 3A:
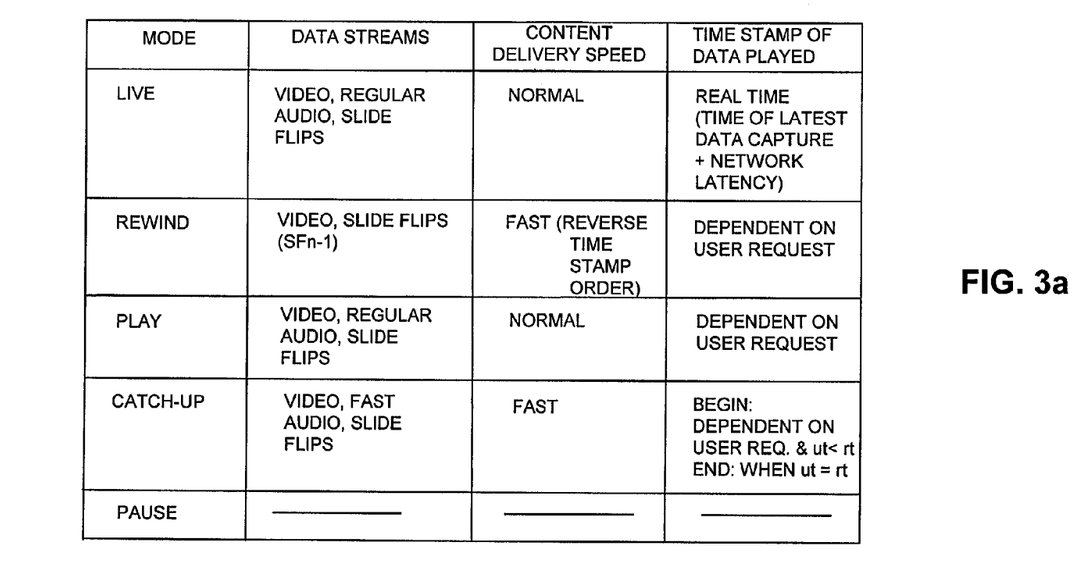
FIG. 3a is a table setting forth selected modes available to users of the system of FIG. 1.
Figure 3B:
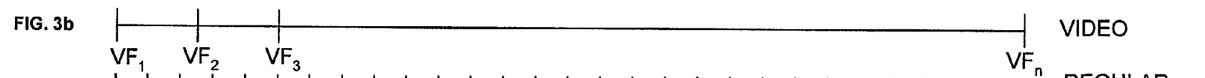
Figure 3C:
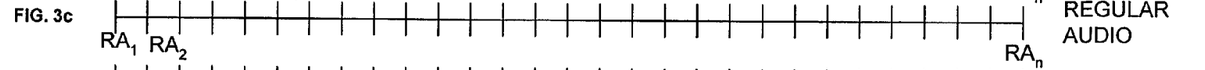
Figure 3D:
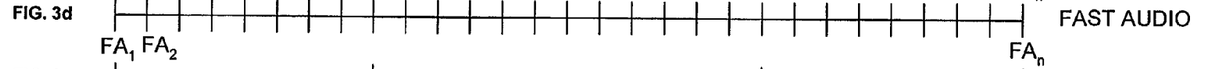
Figure 3E:
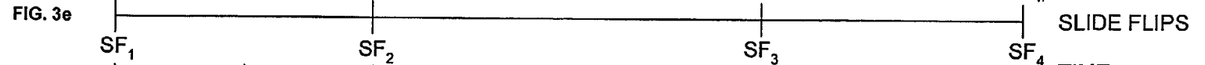

FIGS. 3a–3f illustrate the manner in which stream server 12 provides the necessary data streaming for interactive live navigation to participant computer 14-1. FIG. 3a sets forth selected modes for streaming data in response to live navigation requests. FIG. 3b represents video data consisting of video frames (data units indicates by VF1, VF2, etc.). FIG. 3c represents regular audio data consisting of regular audio samples (data units indicated by RA1, RA2, etc.). FIG. 3d represents fast audio data consisting of fast audio samples (data units indicated by FA1, FA2, etc.). FIG. 3e represents slide flip command data consisting of text (data units indicated by SF1, SF2, etc.) The data elements in each stream (FIGS. 3b–3e) may be associated with a time stamp corresponding to a value along the timeline depicted in FIG. 3f.

Figure 3F:
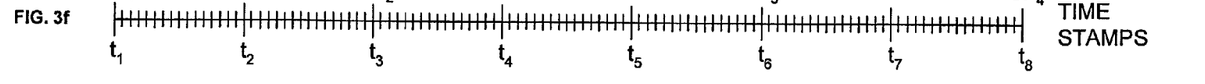
FIG. 3f is a time line.

Please note that the spacing between units on each stream representation depicted in FIGS. 3b–3e and on the time line depicted in FIG. 3f is not to scale nor is the position of data units on one stream representation (FIGS. 3b–3e) relative to the position of data units on other stream representations (FIGS. 3b–3e) or relative to the time line (FIG. 3f) necessarily to scale. Also, the labeled time units t1, t2, etc. in FIG. 3f are not the only time points at which time stamps might be applied; for example there are time stamp positions between t1 and t2. The time labels shown, and the intervening markings, are just for purposes of illustrative discussion and not meant to represent any particular time increments.

Stream server 12 tracks the time position of the live presentation and the time position of the data most recently streamed to the user relative to the time position of the live presentation. For purposes of the table of FIG. 3a, the time position of the live presentation is expressed as rt ("real time") and the time position of the user is expressed as ut ("user time"). Although we refer to the time position of the live presentation as "real time," it will be understood by those skilled in the art that the wide area networks in use currently for web-conferencing typically introduce a noticeable lag between the time data is initially captured and the time the data is delivered to particular network nodes. For example, when we say the user is viewing the presentation "real time" we mean that the user is viewing the presentation data at the nearest time practical after the data was initially captured accounting for existing network latencies (e.g. the user might hear the audio associated with a particular sentence spoken by the speaker 15 seconds after the speaker actually spoke that sentence—we still might say the participant is hearing the data "real time."). More precisely, "real time" position is equal to the original time stamp of data that, among the data currently available for streaming to the client computer, corresponds to the content most recently captured at the speaker console; and "user time" position is equal to the time stamp of data most recently requested by and sent to the client computer.

As indicated in the table of FIG. 3a, stream server 12 can stream data to the user in different modes. The modes individually define how the data is being streamed to the participant and together define the live navigation ability of system 10. If the participant computer has requested to receive the data in the LIVE mode, stream server 12 streams video frames, regular audio data, and slide flips to the participant computer at regular speed. In the presently preferred embodiment, this means that video is delivered at the rate of about 15 frames per second and the regular audio data is delivered at the rate of about 11,025 samples per second. The time stamp position of the data is real time, meaning that of the data currently available for streaming to a client computer, it contains the content most recently captured at the speaker console.

If the participant computer has requested to receive the data in REWIND mode, the stream server delivers video and slide flips for reverse play at fast speed. The time stamp position of the data depends on when REWIND mode was requested and how long REWIND has been the current mode. The video data is delivered in reverse order with respect to the original time stamps. For example, if the participant computer requests REWIND mode when ut=t8, then stream server 12 will begin streaming the video originally stamped between t8 and t7, followed by the video originally stamped between t7 and t6, etc.

Slide flips are delivered in REWIND mode as follows: if in LIVE (or if in PLAY) mode, SF3 is associated with t6, then in REWIND mode, SF2 (i.e. SFn-1 where SFn is the is the slide flip that would have been delivered in a forward mode) is delivered at ut=t6 instead. The reason is that SF2 indicates that the participant computer should retrieve and display slide 2; in a forward mode such as LIVE or PLAY, the user would see slide 2 between time t3 and t6. In order for the user to see slide 2 between time t3 and t6 in REWIND mode, the stream server in REWIND mode must, at t6, deliver SF2 instead of SF3.

If the participant computer requests PLAY mode, the stream server delivers data from the same streams as delivered in LIVE mode (video, regular audio, and slide flips) at normal speed; the only difference is that the time stamp of the data that is streamed is dependent on when the user requested PLAY mode and how long the user has been in PLAY mode. In other words, although a user in PLAY mode is experiencing the content at the same speed as a user in LIVE mode, the user in PLAY mode might be viewing an earlier portion of the presentation. Assuming the media player program on participant computer 11-1 can recognize that the stream server might be delivering data in PLAY mode that has an earlier time stamp than data that may have already been delivered in LIVE mode, stream server 12 will not have to adjust the time stamps originally associated with particular data units at the time of capture by speaker computer 11-1. However, if the media player program on participant computer 11-1 is in a fixed mode that only recognizes a continuous progression of increasing time stamp values, then stream server 12 must re-associate the time stamps of data accordingly. (See FIG. 6 and accompanying text).

A participant computer can request CATCH-UP mode anytime that ut<rt, i.e., at any time user is viewing data with a time stamp that is earlier than the time stamp associated with the current real time position. In CATCH-UP mode, the user is experiencing substantially all of the rich media content, but is actually "catching-up" to the live, real time view of the presentation. Stream server 12 delivers video, slide slips, and fast audio at a content rate greater than the real time rate at which content is being generated for capture by the system.

In the case of video frames, the content rate is increased by increasing the at which data units (i.e. video frames) are delivered. Specifically, in the CATCH-UP mode of the presently preferred embodiment, the video frames are delivered at a rate of 20 frames per second rather than 15 frames per second (the rate for LIVE or PLAY mode).

However, in the case of audio, the content rate is not increased by increasing the data rate (i.e. the rate at which audio samples are delivered). Rather, the content rate is increased by delivering the fast audio track in place of the regular audio track. The fast audio track in CATCH-UP mode is delivered at 11,025 samples per second, the same rate at which regular audio track is delivered in LIVE or PLAY modes. This results in a faster content rate since 11,025 fast audio samples are created from 14,700 regular audio samples and therefore 1 second (11,025 samples) of fast audio contains 1.33 seconds of "real time" content. The fast audio data is such that the user can adequately perceive the content of the speaker's words even though it is being delivered at a faster than real time content rate.

CATCH-UP mode is initiated at the user's request when ut<rt and will automatically continue absent a different user request until ut=rt, that is, until the participant has "caught-up" to the live presentation. As soon as ut=rt, absent a different user request, stream server 12 will switch from CATCH-UP mode to LIVE mode.

In alternative embodiments, a number of other modes might be included. For example, a "FAST-FORWARD" mode might be provided that, unlike the CATCH-UP mode, is designed to be played more rapidly and not include an audio track. As another or additional alternative version of REWIND mode, a graphical user interface might include an on-screen sliding bar that a user can manipulate with mouse controls to quickly jump to any synchronized portion of the currently available data streams.

Alternative embodiments might also include modes corresponding to different qualities of video and audio. In such embodiments, additional separate tracks of audio and video designed to deliver varying degrees of video and audio quality would be provided. The trade-off in using a video or audio track designed for higher quality presentation is that such tracks contain a higher time density of data and therefore require a greater availability of network throughput capacity (i.e. more available bandwidth). In embodiments containing multiple video, multiple regular audio, and multiple fast audio tracks, each of the multiple tracks corresponding to different quality levels, the stream server would select which quality level tracks to play based on either (a) configuration or mode information provided manually, or (b) automatic measurement of the available throughput of the network connection between the stream server and the participant computer. In the case of automatic measurement, the stream server selects the most dense (i.e. highest quality) video and audio tracks that fit within the available throughput capacity.

Figure 4:
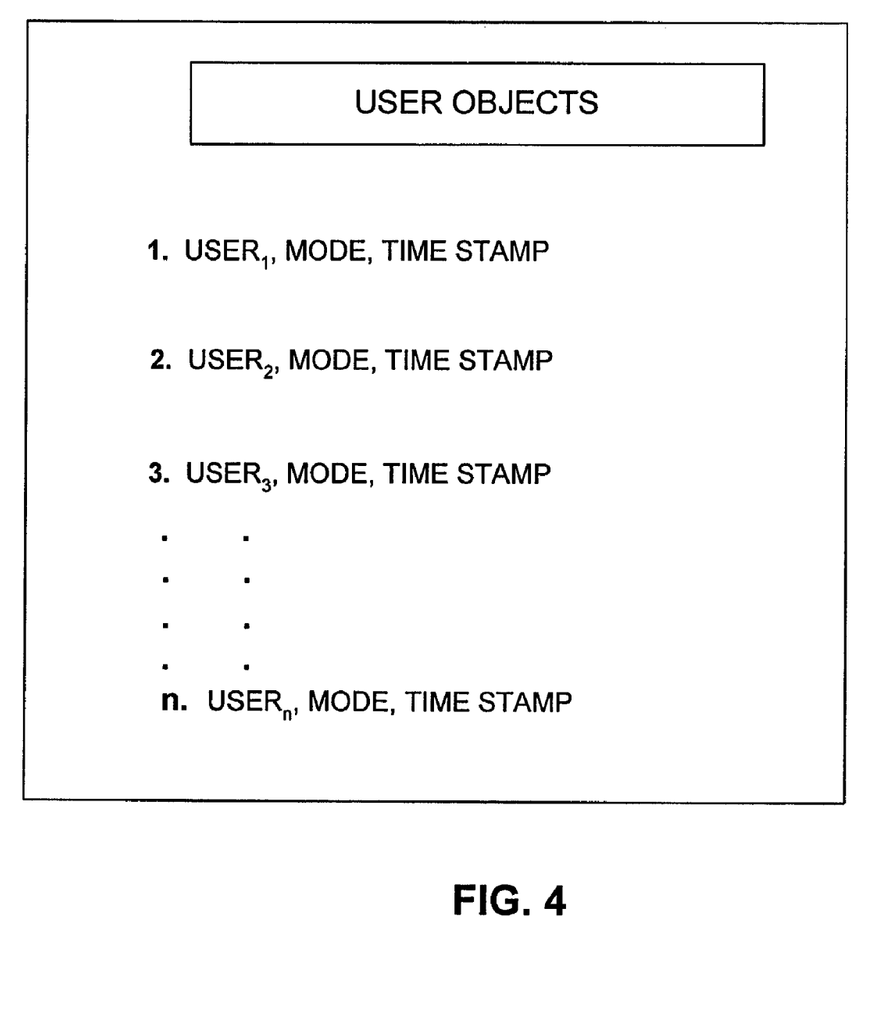
FIG. 4 illustrates user objects for tracking individual users and determining what data should next be streamed to the user.

FIG. 4 illustrates the individual tracking of multiple participant computers as stream server 12 determines what data to send to a particular participant computer at any given time. If the mode and the user time position (the time stamp of data most recently sent to the computer) are known, then stream server 12 can determine what data to stream to the user at any given point in time. Therefore, stream server 12 relies on a collection of user objects to track current mode and current user time position for each individual participant computer (i.e. USER$_1$-USER$_n$) (additional participant computers not shown in FIGS. 1, 2, 5, and 7).

Figure 5:
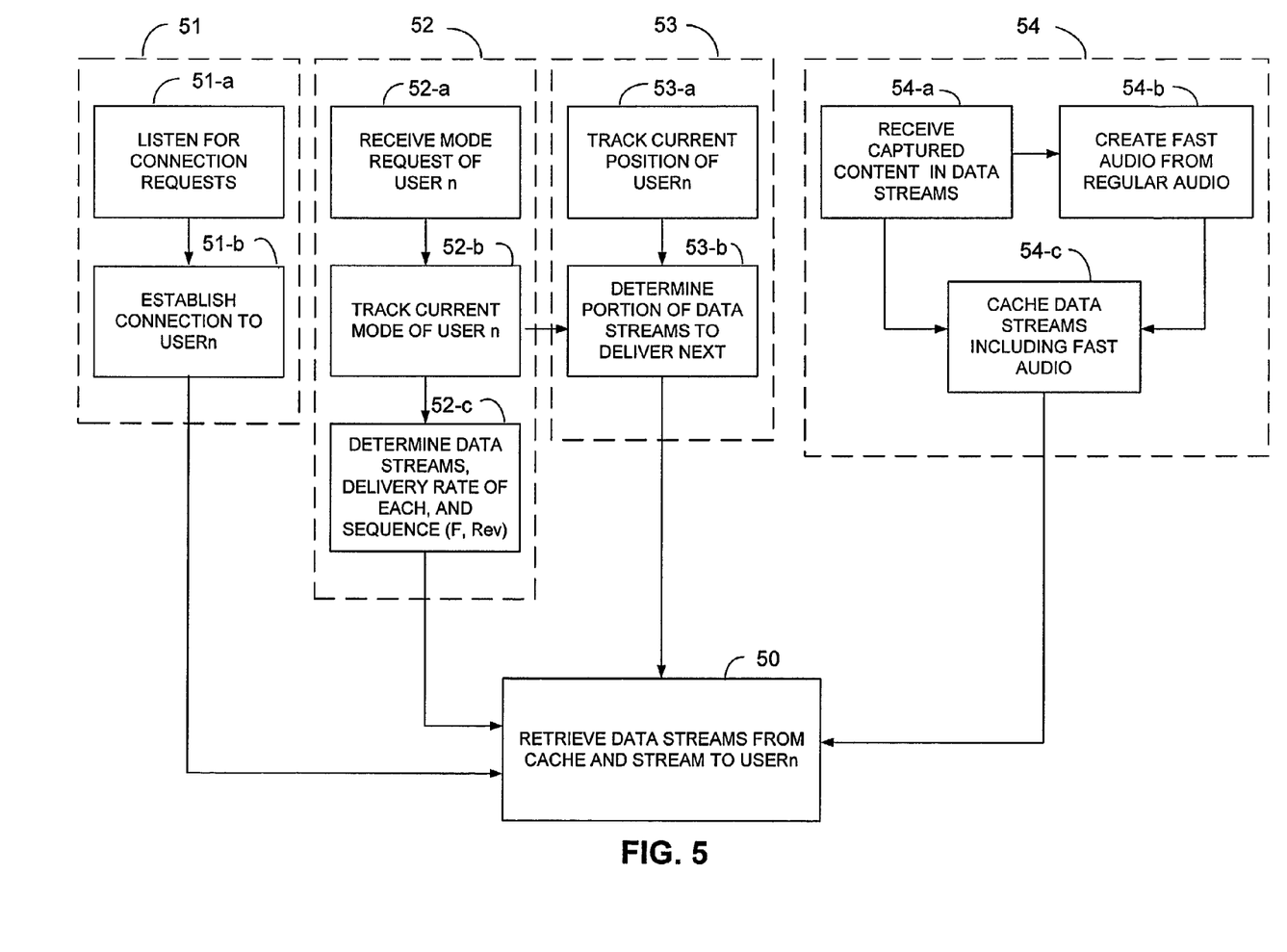
FIG. 5 is a diagram illustrating some of the processing tasks carried out by the stream server of the system of FIG. 1.

FIG. 5 is a diagram illustrating the processing tasks performed by stream server 12. The spatial arrangement of the blocks in FIG. 5 is not meant to require a particular relative time period in which tasks are carried out, rather, it is only meant to show the subtasks that stream server 12 performs (blocksets 51–54) in order to perform the primary task set forth in block 50. Most or all of these processes have already been explicit or implicit in the description of FIGS. 1–4. FIG. 5 is simply intended to highlight some of the processing tasks of stream server 12, it is not meant not to contradict or limit description presented in FIGS. 1–4 and accompanying text.

Block 50 shows the primary task of stream server 12. Stream server 12 streams particular data to particular users at particular times. Broadly speaking, the sub-tasks involved in carrying out the task in Block 50 are: connecting to one or more particular users, tracking which portions of which data streams the user is currently receiving, tracking what mode the user has most recently requested, and streaming appropriate portions of appropriate data streams at the appropriate delivery rate (function of user position and requested mode) from the data streams available at stream server 12.

Blockset 51 includes blocks 51-a and 51-b. In block 51-a, stream server 12 listens on a pre-designated port for a message from a user who wants to connect and start receiving content streams. In block 51-b, once streamer server 12 receives a connection request from USERn, stream server 12 establishes a connection with USERn.

Upon connecting with USERn, stream server 12 creates a user object for USERn (see FIG. 4) which stream server 12 uses to keep track of USERn's current mode request (blockset 52) and position in the data streams (blockset 53) currently being delivered. In block 52-a, stream server 12 receives new mode requests from the user. In block 52-b, stream server 12 tracks the current mode of USERn. The current mode is the most recently requested mode. In other words, stream server 12 assumes that USERn wants to remain in the mode last requested until stream server 12 receives a new mode request from USERn (except that in CATCH-UP mode, as previously described, the mode will automatically switch from CATCH-UP to LIVE once ut=rt; see FIG. 3 and accompanying text). In block 52-c, based on the mode requested, stream server 12 determines which data streams to send to the user (this is mode dependent, e.g., in CATCH-UP mode, stream server 12 sends the fast audio data stream rather than the regular audio data stream), determines the delivery rate of the data streams, and determines the sequence of deliver (forward order relative to the sequence of original capture or reverse order relative to the sequence of original capture). See FIG. 3 and accompanying text for explanation of the relationship between data streams, modes, speed, and order of delivery.

In block 53-a, stream server 12 tracks current position of USERn. In other words, stream server 12 tracks which data has been most recently sent to the user. In block 53-b, stream server 12 determines which portion of which data streams should be sent next. Note that this may depend on both the current mode and upon the current position of USERn. Therefore, the diagram shows an arrow from block 52-b to block 53-b. For example, if USERn has just shifted from PLAY to REWIND mode, the next data to send would depend both upon the position of USERn (which may be based on data sent while the user was still in PLAY mode) and the fact that the user has just requested REWIND mode.

While blocksets 51–53 address sending data to users, blockset 54 addresses receiving data captured by system 10. In block 54-*a*, stream server 12 receives data streams from speaker computer 11-1. In block 54-*b* stream server 12 creates the fast audio data track from the regular audio data. In block 54-*c*, stream server 12 caches both the data streams received from speaker computer 11-1 and the fast audio data stream created by stream server 12.

Based on the tasks of blocksets 51–54, stream server 12 is able to perform the task of block 50, that is, stream particular potions of particular data streams to one or more particular users.

Figure 6:
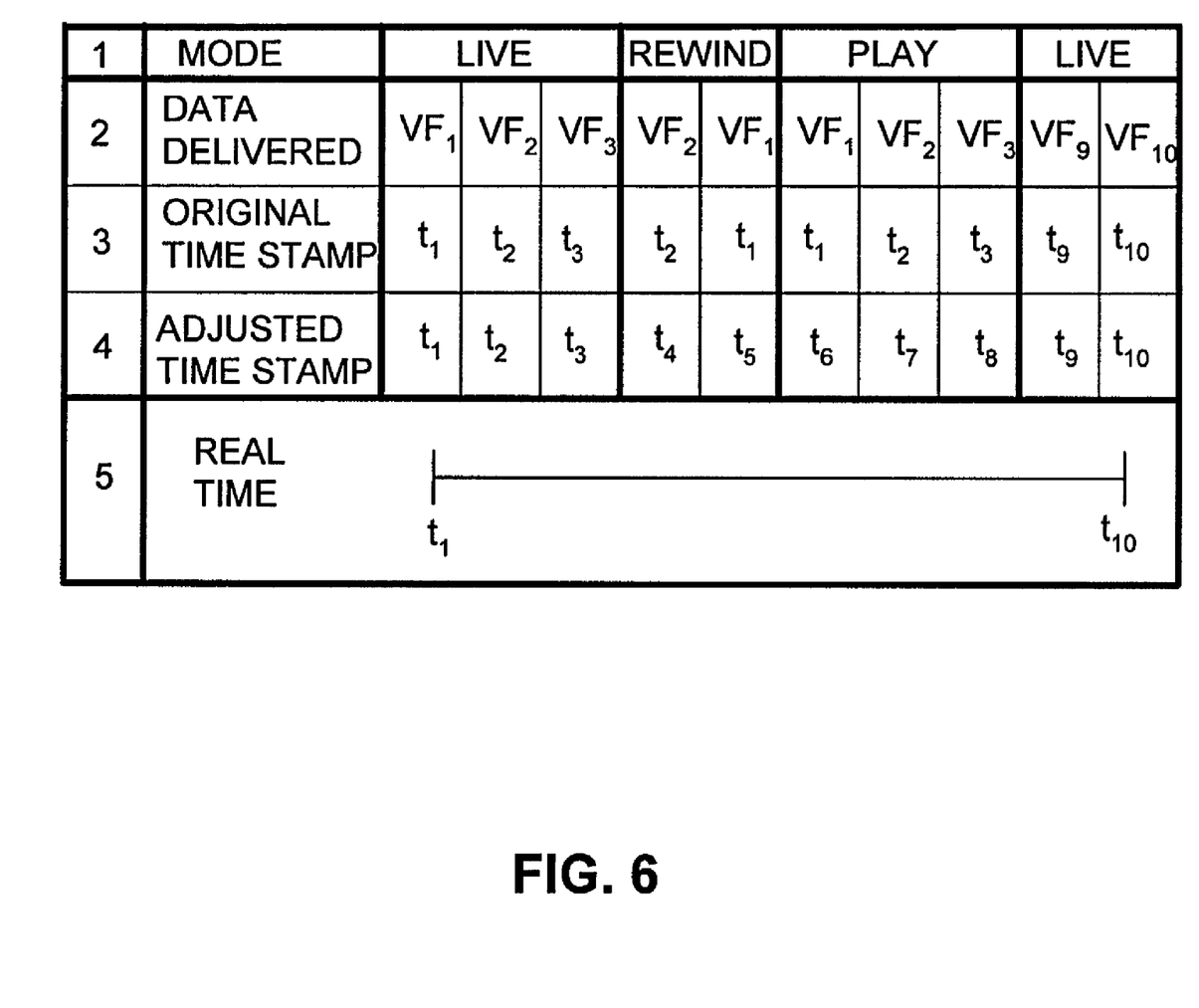
FIG. 6 is a table illustrating how a system in accordance with the present invention may accommodate multiple modes even while a media player program resident on a participating client computer remains in a single mode.

FIG. 6 is a table that illustrates an example of stream server 12 adjusting time stamp information to enable implementation of various modes despite a media player program on participant computer 14-1 being held in a fixed forward play mode. If a media player program on participant computer 14-1 is not constructed for responding to and supporting the various modes implemented by stream server 12, then system 10 may deliver transient instruction code (i.e. instruction code in an electronically readable medium that exists on computer 14-1 temporarily for executing particular tasks, but is not necessarily installed on computer 14-1) to participant computer 14-1 that, working through a browser program on participant computer 14-1, sets the media player program on participant computer 14-1 in a fixed forward play mode and presents a graphical user interface to a participant at participant computer 14-1 through which the participant can request the various modes discussed above (see FIG. 3 and accompanying text).

However, if a media player program on participant computer 14-1 remains in a forward play mode, then stream server 12 must make adjustments to the time stamps associated with the video and audio data streamed to computer 14-1 in order to provide a participant with the experience of different modes. FIG. 6 illustrates an example of such adjustments. Row 1 sets forth a sequence of 4 different modes requested by a participant over time: LIVE, followed by REWIND, followed by PLAY, followed by LIVE. Row 2 sets forth the data from an illustrative video track delivered by stream server 12 to participant computer 14-1 during each mode. Row 3 sets forth an illustrative time stamp associated with each of the video frames (VF1, VF2, etc.) when originally captured by speaker computer 11-1. Row 4 sets forth an adjusted time stamp that stream server 12 associates with the relevant video frame in order to achieve the requested mode even though a desktop player on participant computer 14-1 remains fixed in a mode for playing video frames associated with a continuously increasing progression of time stamp values. Row 5 shows a time line for reference.

In the example shown, a participant first requests LIVE mode and stream server 12 delivers to computer 14-1 the following video: VF1, followed by VF2, followed by VF3. The original time stamps associated with VF1, VF2, and VF3 were t1, t2, and t3 respectively. Since the desktop player is in a mode that expects to play in sequence video frames associated with an increasing progression of time stamp values, stream server 12 does not need to adjust the time stamps originally associated with VF1, VF2, and VF3 when delivering them to participant computer 14-1.

Next, the participant requests REWIND mode. Stream server 12 delivers to computer 14-1 the following video: VF2 followed by VF1. The original time stamps associated with VF2 and VF1 were t2 and t1 respectively. However, because the desktop player on participant computer 14-1 is in a mode that expects to play in sequence video frames associated with an increasing progression of time stamp values, stream server 12 adjusts the times stamps and associates VF2 with t4 and VF1 with t5 prior to delivery.

Next, the participant requests PLAY mode. Stream server 12 delivers in sequence to computer 14-1 the following video: VF1, followed by VF2, followed by VF3. The originally associated time stamps were t1, t2, and t3 respectively. However, because the desktop player is in a mode that expects to play in sequence video frames associated with an increasing progression of time stamp values, stream server 12 adjusts the time stamp values and associates VF1 with t6, VF2 with t7, and VF3 with t8 prior to delivery.

Next, the participant again requests LIVE mode. In this example, it is assumed that while the participant was in REWIND mode and in PLAY mode, new video frames captured new content at speaker computer 11-1 and were delivered to and cached by stream server 12. Therefore, to switch from PLAY mode to LIVE mode as illustrated (without first switching to a CATCH-UP mode) will result in skipping over some of the recently cached video frames. So during LIVE mode, stream server 12 now delivers the following video: VF9 followed by VF10. The original time stamps associated with VF9 and VF10 were, in this example, t9 and t10 respectively. Since the desktop player is in a mode that expects to play in sequence video frames associated with an increasing progression of time stamp values, stream server 12 this time does not need to adjust the time stamps originally associated with VF9 and VF10 when delivering them to participant computer 14-1.

Those skilled in the art will recognize that a participant could not realistically switch modes fast enough to have so few video frames delivered during each stage of the above example. Thus, it will be appreciated that the above example is simplified to highlight the process of making time stamp adjustments.

Although not illustrated in FIG. 6, stream server 12 may also accommodate switching in and out of the CATCH-UP mode even if a media player program on participant computer 14-1 remains in a fixed regular play mode. In CATCH-UP mode, as previously described, stream server 12 delivers video to participant computer 14-1 at a rate of 20 frames per second instead of the 15 frame per second delivery rate in LIVE or PLAY mode. Assuming the desktop player program on participant computer 14-1 is fixed in a play mode in which it cannot present video frames at a faster rate unless the time stamps associated with the delivery of the data trigger a faster rate, stream server 12 simply adjusts the time stamp values associated with each video frame so that the time stamps are consistent with the faster rate for video frame delivery in CATCH-UP mode. For example, if the increment between time stamps originally associated with VF1 and VF2 when captured at speaker computer 11-1 is $\frac{1}{15}$th of a second, stream server 12 will adjust the time stamps associated with VF1 and VF2 so that the increment in CATCH-UP mode is $\frac{1}{20}$th of a second. In addition, if the desktop player has, for example, just received a video frame having an associated time stamp of t9 and the next video frame to be delivered in CATCH-UP mode (e.g. VF2) originally was associated with a time stamp of t2, stream server 12 will adjust the time stamp value associated with VF2 to some value greater than t9 since the media player on participant computer 14-1 expects a sequence of video frames associated with an increasing progression of time stamp values. In CATCH-UP mode, stream server 12 also synchronizes streaming of the fast audio with the streaming of the video and makes the necessary time stamp associations with the fast audio data so that the desktop player program on participant computer 14-1 presents both the video and the fast audio data in a manner consistent with the CATCH-UP mode.

Figure 7:
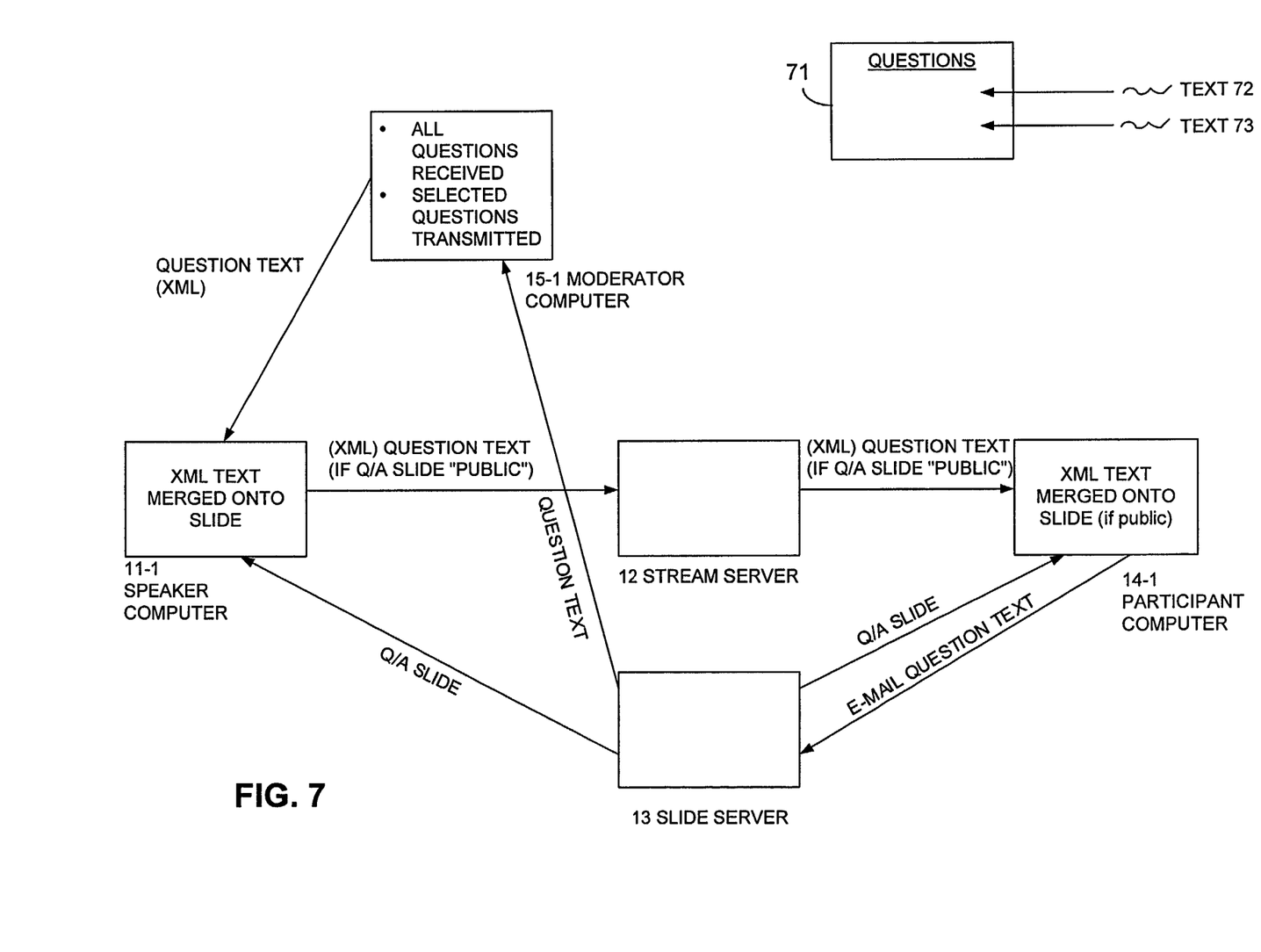
FIG. 7 illustrates the creation of, and data flow related to, a Q/A slide that facilitates handling of participant questions and comments.

FIG. 7 illustrates an "on-the-fly" slide creation process carried out by system 10 for enhancing the speaker's ability to smoothly weave questions and responses into the presentation. Although it is desirable for a speaker to allow and respond to audience questions, it may be helpful to the speaker to have some control over when in the course of the presentation questions will be addressed. System 10 utilizes the slide creation and display process as an opportunity for speakers to control the flow of questions during the presentation. The speaker (or other author) may create a Q/A slide such as Q/A slide 71 which might consist of nothing more the title "Questions" and some background color. The speaker inserts such a slide into the presentation at a point relative to the discussion of other slides that the speaker would like to entertain audience questions. When a Q/A slide 71 is selected for display by the speaker (i.e. the speaker inputs a slide flip command in which the speaker computer and the participant computers are instructed to "get (and display) Q/A slide 71"), question text, such as text 72 and text 73, is exported to speaker computer 11-1 in XML ("eXtensible Markup Language") format from moderator computer 15-1. At the speaker computer 11-1 the question text (and any annotation text added by the moderator) is merged into the Q/A slide and the Q/A slide is displayed for the speaker including actual questions from the audience. If the speaker has decided to create a "private" Q/A slide, the XML text stream will not be transmitted beyond speaker computer 11-1. However, if the speaker has decided to created a "public" Q/A slide, the XML text stream will be transmitted from speaker computer 11-1 to stream server 12 for caching and delivery to participant computer 14-1 where it will be merged with the copy of the Q/A slide 51 that participant computer has requested from slide server 13. A speaker might create multiple Q/A slides. This allows the speaker to view (and optionally display for the audience) questions as they arise at various points in the presentation.

Both the transmission for question text and the transmission of slide flips may be accomplished through a singe text stream. The text stream will, at various times, contain either XML text of slide flip command text.

It will be appreciated by those skilled in the art that most web browsers can automatically display text in XML format. Therefore, by sending the question (and annotation) text in XML format, system 10 makes the merge and display of the question text with the Q/A slide particularly easy. In alternative embodiments, the text of the question could be sent in a simple text format, such as ASCII, and the speaker computer and participant computer would reformat the text into a browser-displayable format (such as XML or HTML), and then merge the text with the slide for display.

It will be appreciated by those skilled in the art that many of the tasks described above might, in alternative embodiments, be combined on a fewer (or greater) number of machines than the number of machines in system 10. To cite by one example, stream server 12 might also perform all the tasks performed by slide server 13 and/or voice server 16 without departing from the spirit of the present invention. However, we believe the configuration of system 10 offers good performance given existing technologies and is thus the presently preferred embodiment.

We claim:

1. A method of streaming a first data stream of a live event in a first and second streaming modes supported at a first computer connected to a first side of a wide area network from the first computer to a second computer connected to a second side of the wide area network, the second computer having a media player program for presenting content of the first data stream to a user at the second computer, a first mode of the media player program not changing in response to a change from the first of the streaming modes to the second of the streaming modes, the method comprising:

the first computer sending executable instruction code to the second computer for invoking the first mode of the media player program and for presenting an on-screen interface allowing a user at the second computer to request in successive fashion at least the first and the second of the plurality of streaming modes supported at the first computer;

in response to a request received at the first computer from a user at the second computer during the live event to change from the first of the plurality of streaming modes to the second of the plurality of streaming modes, associating time stamp values with data units of the first data stream such that the media player program at the second computer will present content of the first data stream in a manner providing the user at the second computer an experience of a mode change while the media player program remains in the first mode of the media player program, wherein the first mode of the media player program is a mode for playing content at a first content rate, the first mode of the streaming modes is a mode for playing content at the first content rate, and the second mode of the streaming modes is a mode for playing content at a second content rate, the second content rate being faster than the first content rate, and wherein when streaming in the second of the plurality of modes, time stamps of data units sent to the second computer are adjusted such that a time value difference between the time stamps of a first data unit and a second data unit is less than the time value difference between the time stamps originally applied to the first data unit and the second data unit so that the media player program, while remaining in a mode for playing content at the first content rate, plays content at the second content rate; and wherein one of the streaming mode is a live streaming mode for presenting live content of the live event and the other one of the streaming mode is a non-live streaming mode for presenting content of the live event that is less recent than the live content, and wherein the first mode of the media player transitions from the non-live streaming mode to the live streaming mode when the time stamp value of the data units of the non-live streaming mode catches up to the time stamp values of the live streaming mode.

2. The system of claim 1 wherein the first data stream is a first sequence of audio samples.

3. The system of claim 1 wherein the first data stream includes a first sequence of video frames.

4. The system of claim 1 wherein the first data stream includes a first sequence of commands for directing the second computer to retrieve and present a sequence of slides.

5. The method of claim 1 wherein the first mode of the media player is a mode for playing in sequence data units having successively increasing time stamp values, the first mode of the streaming modes is the live streaming mode, the second mode of the streaming modes is the non-live streaming mode having a first identifiable difference between an originally applied time stamp of a data unit to be next delivered from the first computer to the second computer and a time stamp corresponding to real time wherein the time stamp value of the data unit to be next delivered is changed from the originally applied time stamp to the time stamp corresponding to real time such that the second computer continues to receive data units that have successively increasing time stamp values when a mode change from the first of the streaming modes to the second of the streaming modes occurs.

6. A system for streaming a first data stream of a live event in a first and second streaming modes supported at a first computer connected to a first side of a wide area network from the first computer to a second computer connected to a second side of the wide area network, the second computer having a media player program for presenting content of the first data stream to a user at the second computer, a first mode of the media player program not changing in response to a change from the first of the streaming modes to the second of the streaming modes, the system comprising:

the first computer configured to send executable instruction code to the second computer for invoking the first mode of the media player program and for presenting an on-screen interface allowing a user at the second computer to request in successive fashion at least the first and the second of the plurality of streaming modes supported at the first computer;

the second computer that is configured to send a request from a user to the first computer during the live event in response to which the first computer is to change from the first of the plurality of streaming modes to the second of the plurality of streaming modes, and is further configured to use time stamp values associated with data units of the first data stream such that the media player program at the second computer will present content of the first data stream in a manner providing the user at the second computer an experience of a mode change while the media player program remains in the first mode of the media player program, wherein the first mode of the media player program is a mode for playing content at a first content rate, the first mode of the streaming modes is a mode for playing content at the first content rate, and the second mode of the streaming modes is a mode for playing content at a second content rate, the second content rate being faster than the first content rate, and wherein when streaming in the second of the plurality of modes, time stamps of data units sent to the second computer are adjusted such that a time value difference between the time stamps of a first data unit and a second data unit is less than the time value difference between the time stamps originally applied to the first data unit and the second data unit so that the media player program, while remaining in a mode for playing content at the first content rate, plays content at the second content rate; and wherein one of the streaming mode is a live streaming mode for presenting live content of the live event and the other one of the streaming mode is a non-live streaming mode for presenting content of the live event that is less recent than the live content, and the first mode of the media player transitions from the non-live streaming mode to the live streaming mode when the time stamp value of the data units of the non-live streaming mode catches up to the time stamp values of the live streaming mode.

7. The method of claim 6 wherein the first data stream is a first sequence of audio samples.

8. The method of claim 6 wherein the first data stream includes a first sequence of video frames.

9. The method of claim 6 wherein the first data stream includes a first sequence of commands for directing the second computer to retrieve and present a sequence of slides.

10. The system of claim 6 wherein the first mode of the media player is a mode for playing in sequence data units having successively increasing time stamp values, the first mode of the streaming modes is the live streaming mode, the second mode of the streaming modes is the non-live streaming mode having a first identifiable difference between an originally applied time stamp of a data unit to be next delivered from the first computer to the second computer and a time stamp corresponding to real time wherein the time stamp value of the data unit to be next delivered is changed from the originally applied time stamp to the time stamp corresponding to real time such that the second computer continues to receive data units that have successively increasing time stamp values when a mode change from the first of the streaming modes to the second of the streaming modes occurs.

* * * * *

UNITED STATES PATENT AND TRADEMARK OFFICE
CERTIFICATE OF CORRECTION

PATENT NO. : 7,085,842 B2  Page 1 of 1
APPLICATION NO. : 09/782172
DATED : August 1, 2006
INVENTOR(S) : Reid et al.

It is certified that error appears in the above-identified patent and that said Letters Patent is hereby corrected as shown below:

Title Page:
Item (54), change the title from "LINE NAVIGATION CONFERENCING SYSTEM" to -- LIVE NAVIGATION WEB-CONFERENCING SYSTEM AND METHOD --.

Column 18:
Line 56, after "2. The", change "system" to -- method --.
Line 58, after "3. The", change "system" to -- method --.
Line 60, after "4. The", change "system" to -- method --.

Column 20:
Line 22, after "7. The", change "method" to -- system --.
Line 24, after "8. The", change "method" to -- system --.
Line 26, after "9. The", change "method" to -- system --.

Signed and Sealed this

Twenty-fourth Day of October, 2006

JON W. DUDAS
*Director of the United States Patent and Trademark Office*